US012257905B2

(12) United States Patent
Ohno et al.

(10) Patent No.: US 12,257,905 B2
(45) Date of Patent: Mar. 25, 2025

(54) ELECTRIC VEHICLE

(71) Applicant: Mazda Motor Corporation, Hiroshima (JP)

(72) Inventors: Osami Ohno, Aki-gun (JP); Satoshi Maruyama, Aki-gun (JP); Hiroshi Tanaka, Aki-gun (JP); Kei Yonemori, Aki-gun (JP); Akihiro Furukawa, Aki-gun (JP); Li-Hsuan Huang, Taichung (TW); Chih-Yuan Chen, Taichung (TW); Iou-Uei Jang, Taichung (TW)

(73) Assignee: Mazda Motor Corporation, Hiroshima (JP)

( * ) Notice: Subject to any disclaimer, the term of this patent is extended or adjusted under 35 U.S.C. 154(b) by 343 days.

(21) Appl. No.: 18/062,730

(22) Filed: Dec. 7, 2022

(65) Prior Publication Data

US 2023/0191893 A1 Jun. 22, 2023

(30) Foreign Application Priority Data

Dec. 22, 2021 (JP) ................................. 2021-207734

(51) Int. Cl.
| | |
|---|---|
| *B60K 6/44* | (2007.10) |
| *B60K 1/00* | (2006.01) |
| *B60K 1/04* | (2019.01) |
| *B60K 6/24* | (2007.10) |
| *B60K 6/26* | (2007.10) |
| *B60K 6/28* | (2007.10) |

(Continued)

(52) U.S. Cl.
CPC .................. *B60K 6/44* (2013.01); *B60K 1/00* (2013.01); *B60K 1/04* (2013.01); *B60K 6/24* (2013.01); *B60K 6/26* (2013.01); *B60K 6/28* (2013.01); *B60L 50/10* (2019.02); *B60L 50/66* (2019.02); *B60K 2001/0405* (2013.01); *B60Y 2400/20* (2013.01)

(58) Field of Classification Search
CPC ... B60K 6/24; B60K 6/26; B60K 6/28; B60K 2001/0411; B60L 50/64; B60L 50/66
See application file for complete search history.

(56) References Cited

U.S. PATENT DOCUMENTS

| | | | | |
|---|---|---|---|---|
| 9,260,034 | B2 * | 2/2016 | Naito | ..................... B60L 50/72 |
| 10,314,210 | B2 * | 6/2019 | Taguchi | ................... B60K 1/00 |
| 10,384,544 | B2 * | 8/2019 | Sekine | ..................... B60K 1/04 |

(Continued)

FOREIGN PATENT DOCUMENTS

JP 2020138718 A 9/2020

*Primary Examiner* — Jeffrey J Restifo
(74) *Attorney, Agent, or Firm* — Alleman Hall & Tuttle LLP

(57) ABSTRACT

To arrange a power unit, an electric power conversion unit, and engine-related components compactly, a drive motor, a reduction drive, a generator, and an engine body are integrally arranged in this order in a vehicle width direction of a power unit compartment such that respective heights thereof are substantially the same. An electric power conversion unit, in which a motor inverter, an electric power generation inverter, and a DC/DC converter are integrated, is arranged above the drive motor, the reduction drive, and the generator. Engine-related components such as a low-voltage battery, an air cleaner, and an oil filter are arranged above the engine body.

5 Claims, 6 Drawing Sheets

(51) Int. Cl.
    *B60L 50/10*         (2019.01)
    *B60L 50/60*         (2019.01)

(56) References Cited

U.S. PATENT DOCUMENTS

| | | | |
|---|---|---|---|
| 10,399,428 B2 * | 9/2019 | Fujiyoshi | B60K 1/04 |
| 10,464,613 B2 * | 11/2019 | Okura | B60K 5/12 |
| 2017/0334310 A1 * | 11/2017 | Yokoyama | B60L 58/26 |
| 2021/0379979 A1 * | 12/2021 | Toda | B60K 6/40 |
| 2023/0191893 A1 * | 6/2023 | Ohno | B60K 6/46 |
| | | | 180/65.225 |

* cited by examiner

ELECTRIC VEHICLE

TECHNICAL FIELD

A technique disclosed herein belongs to a technical field related to an electric vehicle.

BACKGROUND ART

As a structure of an electric vehicle in which electric power is supplied to a drive motor so as to drive the vehicle, for example, as disclosed in JP2020-138718A, such a structure has been known that the drive motor, a reduction drive, an engine body, and a generator are integrally arranged in this order in a vehicle width direction and, above all of these, an electric power conversion unit including an inverter and a converter is arranged.

SUMMARY OF THE INVENTION

Problem to be Solved by the Invention

In the case where the electric power conversion unit is arranged as described above, it is difficult to arrange engine-related components, such as intake system components, combustion system components, cooling system components, and a battery, above the engine body.

The technique disclosed herein has been made in view of such a point and therefore has a purpose of compactly arranging a power unit, an electric power conversion unit, and engine-related components.

Means for Solving the Problem

In order to solve the above problem, a technique disclosed herein is adopted for an electric vehicle that includes a drive motor that drives the vehicle by using electric power, a reduction drive that reduces power from the drive motor and outputs the reduced power, a generator that generates the electric power to be supplied to the drive motor, and an engine body that drives the generator, and that is configured to transmit output of the reduction drive to a drive wheel. The technique disclosed herein is configured such that the drive motor, the reduction drive, the generator, and the engine body are integrally arranged in this order in a vehicle width direction of a power unit compartment such that respective heights thereof are substantially the same, that an electric power conversion unit, in which a motor inverter, an electric power generation inverter, and a DC/DC converter are integrated, is arranged above the drive motor, the reduction drive, and the generator, and that engine-related components are arranged above the engine body.

According to this configuration, the electric power conversion unit and the engine-related components can separately be arranged in the vehicle width direction at positions above the power unit including the drive motor, the reduction drive, the generator, and the engine body. Therefore, it is possible to compactly arrange the power unit, the electric power conversion unit, and the engine-related components.

In one embodiment, the engine body is a rotary engine.

According to this configuration, the rotary engine has a vertically compact structure. Therefore, it is possible to substantially equalize the heights of the drive motor, the reduction drive, the generator, and the engine body, and thus to further compactly arrange these components.

In one embodiment, a rotary shaft of the engine body, a generator shaft of the generator, and a motor shaft of the drive motor extend in the vehicle width direction and are arranged on the same straight line.

According to this configuration, in the case where the rotary engine is used as the engine body, it is easy to arrange a rotary shaft thereof on the same straight line as the motor shaft and the generator shaft due to a fact that a portion of the rotary engine above the rotary shaft is compact. Therefore, the heights of the engine body, the drive motor, the reduction drive, and the generator can further easily be equalized.

In one embodiment, the engine body is a forward-intake type and a forward-exhaust type, and the engine-related components include intake-related components that are arranged in front of the engine body, fuel and oil-related components that are arranged directly above the engine body, and a battery that is arranged behind the engine body.

According to this configuration, it is possible to appropriately arrange the engine-related components in a front-rear direction at a position above the engine body.

In one embodiment, the engine-related components are arranged to be projected outward from the engine body in the vehicle width direction, and exhaust-related components run through a lateral side of the engine body and below the engine-related components and are routed behind the engine body.

According to this configuration, a space is provided below portions of the engine-related components that are projected outward in the vehicle width direction, and the exhaust-related components can be arranged by using such a space. Therefore, it is possible to compactly arrange the engine-related components including the exhaust-related components.

Advantage of the Invention

As it has been described so far, according to the technique disclosed herein, it is possible to compactly arrange the power unit, the electric power conversion unit, and the engine-related components.

MODES FOR CARRYING OUT THE INVENTION

A detailed description will hereinafter be made on an exemplary embodiment with reference to the drawings. In the following description, a vehicle front-rear direction will simply be referred to as a "front-rear direction," a vehicle front side will simply be referred to as a "front side," and a vehicle rear side will simply be referred to as a "rear side." A vehicle width direction is a right-left direction of the vehicle, a vehicle left side will simply be referred to as a "left side," and a vehicle right side will simply be referred to as a "right side." In addition, in the right-left direction, the left side at the time when the front side is seen from the rear side will be referred to as left, and the right side at such time will be referred to as right.

Figure 1:
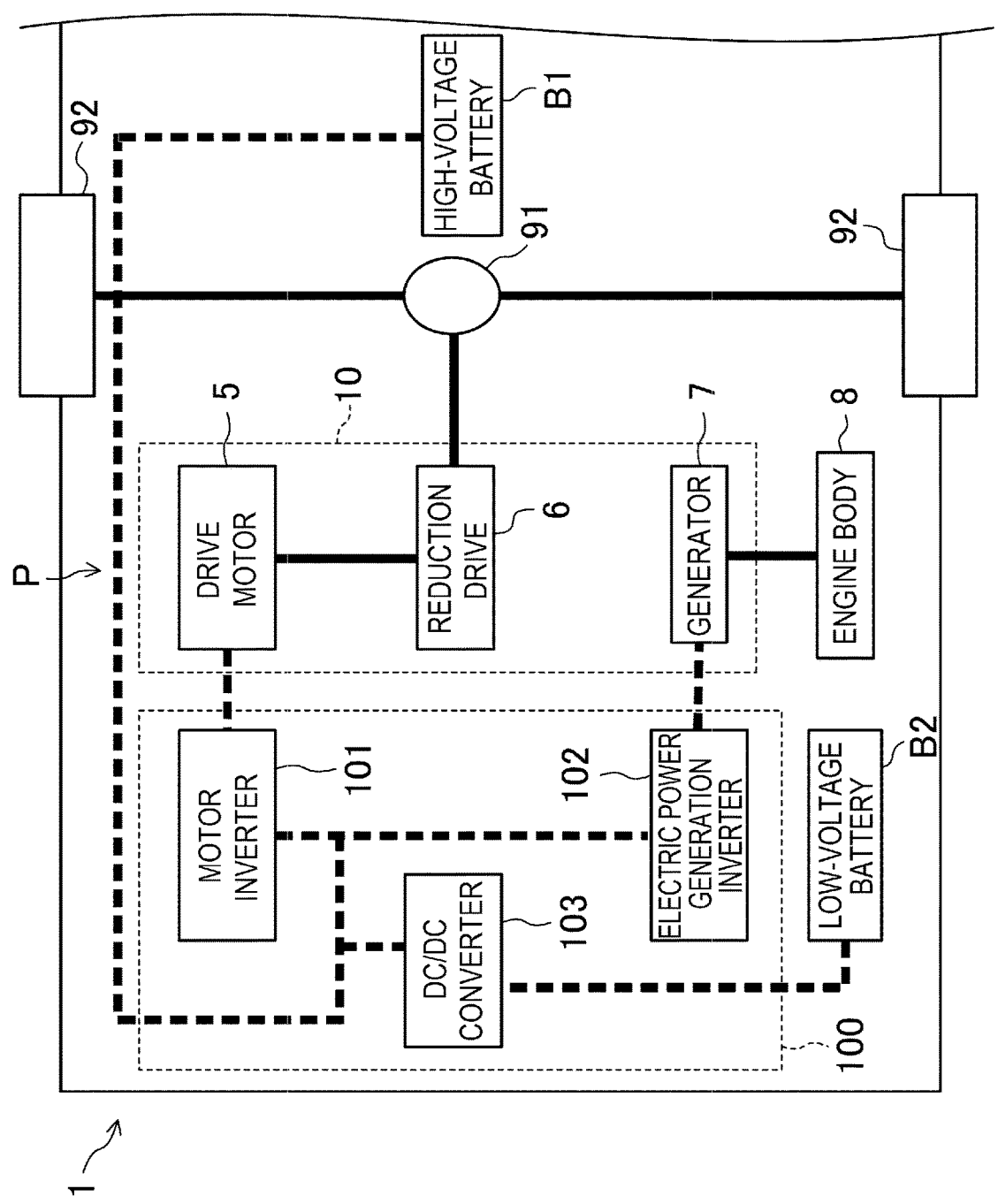
FIG. 1 is a block diagram illustrating a drive system of an electric vehicle according to an exemplary embodiment.
Figure 2:
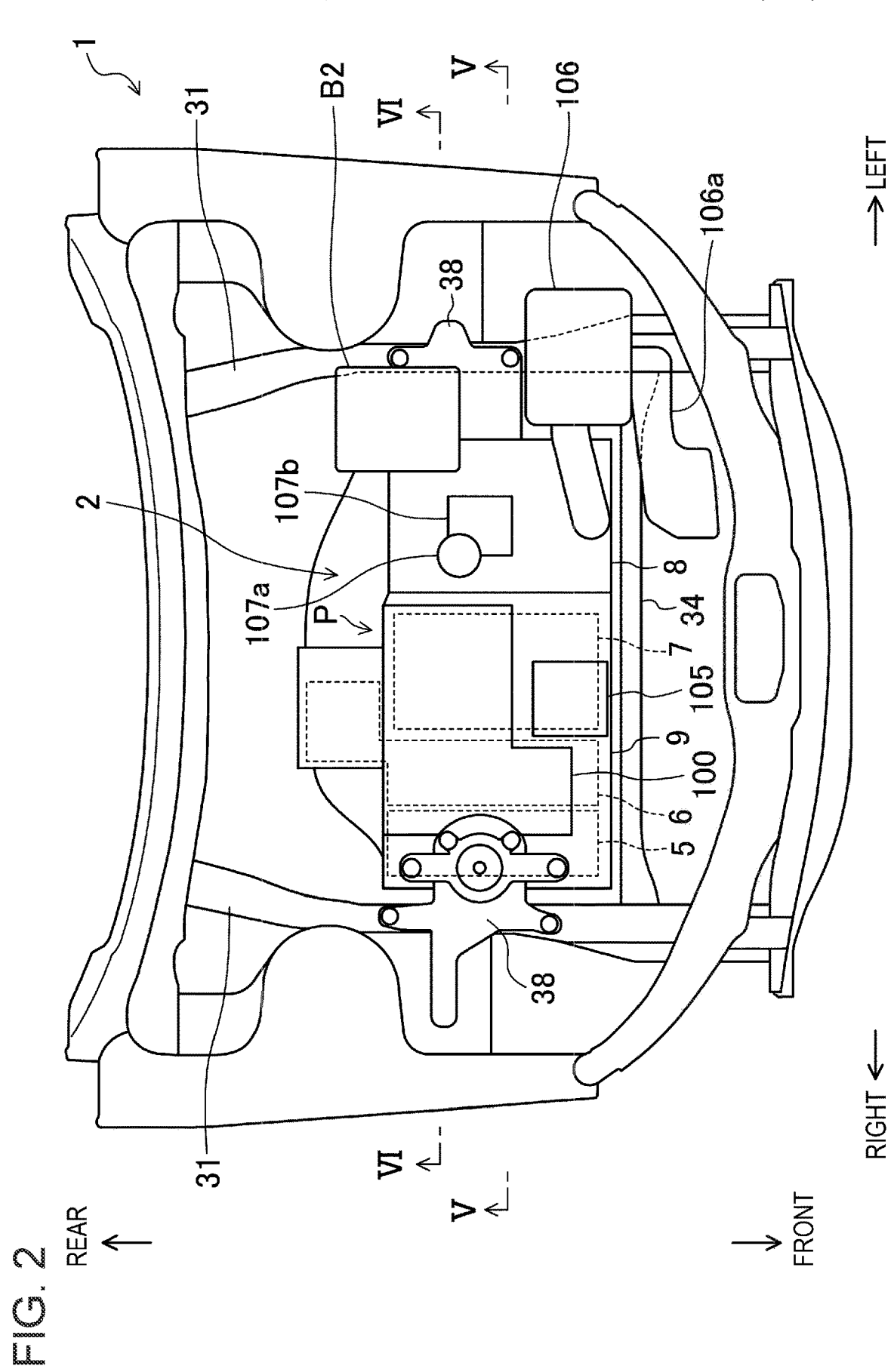
FIG. 2 is a plan view illustrating a power unit compartment.

FIG. 1 is a block diagram illustrating a drive system of an electric vehicle according to the exemplary embodiment. FIG. 2 is a plan view schematically illustrating a power unit. FIG. 1 and FIG. 2 schematically illustrate a drive system of a vehicle 1, and arrangement of each component does not limit actual arrangement of each of the components.

The vehicle 1 is a series hybrid vehicle. The vehicle 1 includes a power unit P that is constructed of an electric drive unit 10 for driving the vehicle 1 by using electric power and an engine body 8 for generating the electric power. The electric drive unit 10 has a drive motor 5 that drives the vehicle by using the electric power, a reduction drive 6 that reduces power from the drive motor 5 and outputs the reduced power, and a generator 7 that generates the electric power to be supplied to the drive motor 5.

An engine has the engine body 8 and engine-related components. The engine body 8 is primarily used to drive the generator 7 for the electric power generation, and the power for driving the vehicle 1 is generated by the drive motor 5. The power generated by the drive motor 5 is shifted by the reduction drive 6, and is thereafter transmitted to drive wheels 92 (front wheels herein) via a differential 91.

The vehicle 1 includes a high-voltage battery B1 and a low-voltage battery B2. The high-voltage battery B1 is charged with electricity that is generated by the generator 7. An electric power generation inverter 102 is provided between the generator 7 and the high-voltage battery B1. The electric power generation inverter 102 is electrically connected to the generator 7 and the high-voltage battery B1. The generated electricity from the generator 7 is supplied to the high-voltage battery B1 via the electric power generation inverter 102. A motor inverter 101 is provided between the drive motor 5 and the high-voltage battery B1. The motor inverter 101 is electrically connected to the drive motor 5 and the high-voltage battery B1. The motor inverter 101 converts the electricity from the high-voltage battery B1 into the electric power for driving the drive motor 5, and outputs the electric power to the drive motor 5. A DC/DC converter 103 is provided between the high-voltage battery B1 and the low-voltage battery B2. The DC/DC converter 103 is electrically connected to the high-voltage battery B1 and the low-voltage battery B2. The electricity from the high-voltage battery B1 is supplied to the low-voltage battery B2 via the DC/DC converter 103. The generated electricity from the generator 7 is supplied to the low-voltage battery B2 via the electric power generation inverter 102 and the DC/DC converter 103. The motor inverter 101, the electric power generation inverter 102, and the DC/DC converter 103 integrally constitute an electric power conversion unit 100.

Figure 3:
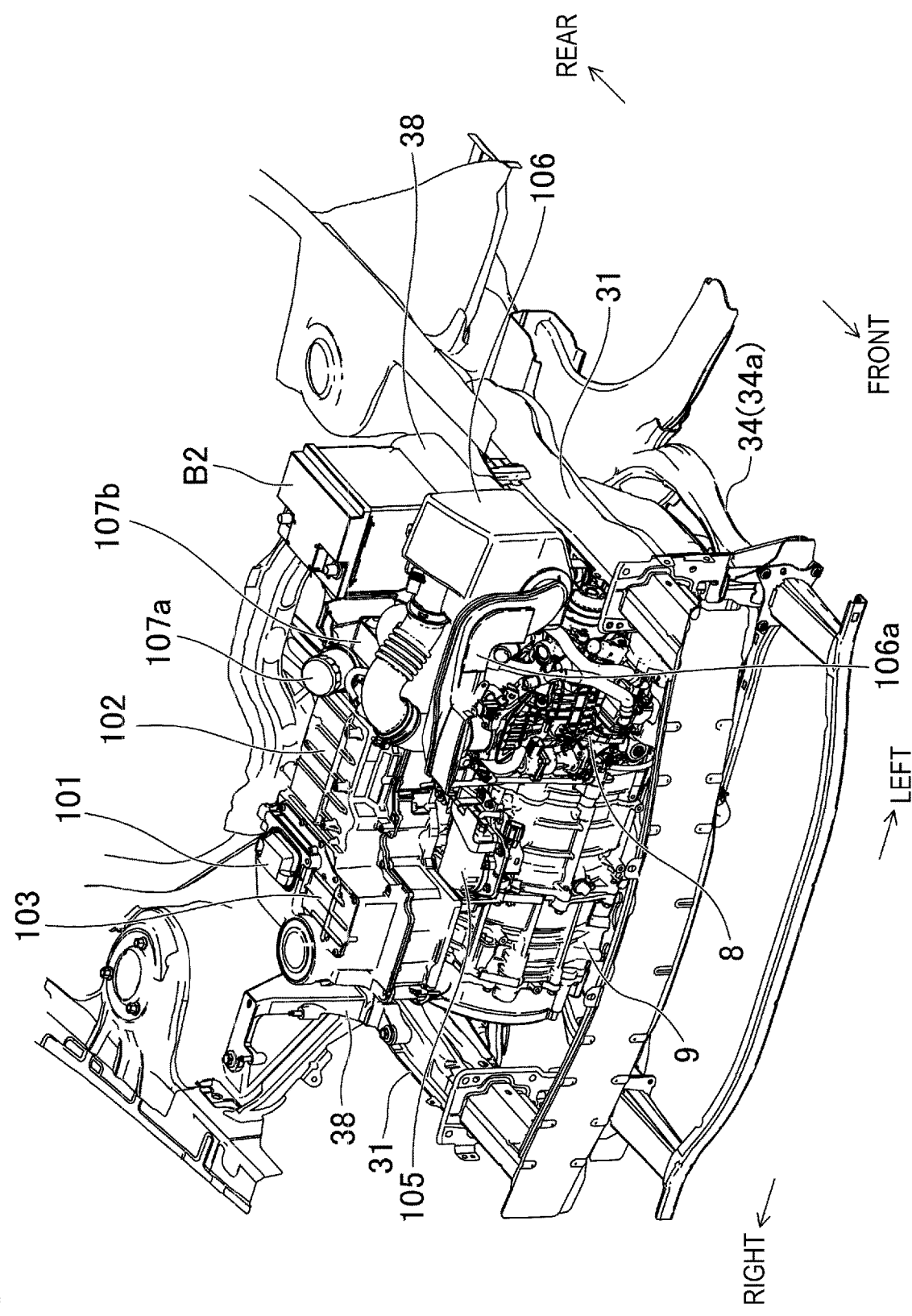
FIG. 3 is a perspective view in which the power unit compartment is seen from a front left side.

FIG. 3 is a perspective view in which a power unit compartment 2 is seen from a front left side. As illustrated in FIG. 2 and FIG. 3, the vehicle 1 includes a right and left pair of body side frames 31 in a front portion thereof, and the right and left pair of the body side frames 31 at least extends in the front-rear direction and is arranged on both sides in the vehicle width direction. A subframe 34 that has a side member 34a extending in the front-rear direction is fastened to a lower portion of each of the body side frames 31.

The power unit P is disposed in the power unit compartment 2 that is formed by the body side frames 31 and the subframes 34. The power unit P is supported between the right and left body side frames 31, 31 via support members 38, each of which is provided to the respective body side frame 31.

The electric power conversion unit 100, in which the motor inverter 101, the electric power generation inverter 102, and the DC/DC converter 103 are integrated, is disposed above a drive unit housing 9 for accommodating the drive motor 5, the reduction drive 6, and the generator 7. The engine-related components such as an air cleaner 106, an oil filter 107a, an oil cooler 107b, and the low-voltage battery B2 are arranged above the engine body 8.

Figure 4:
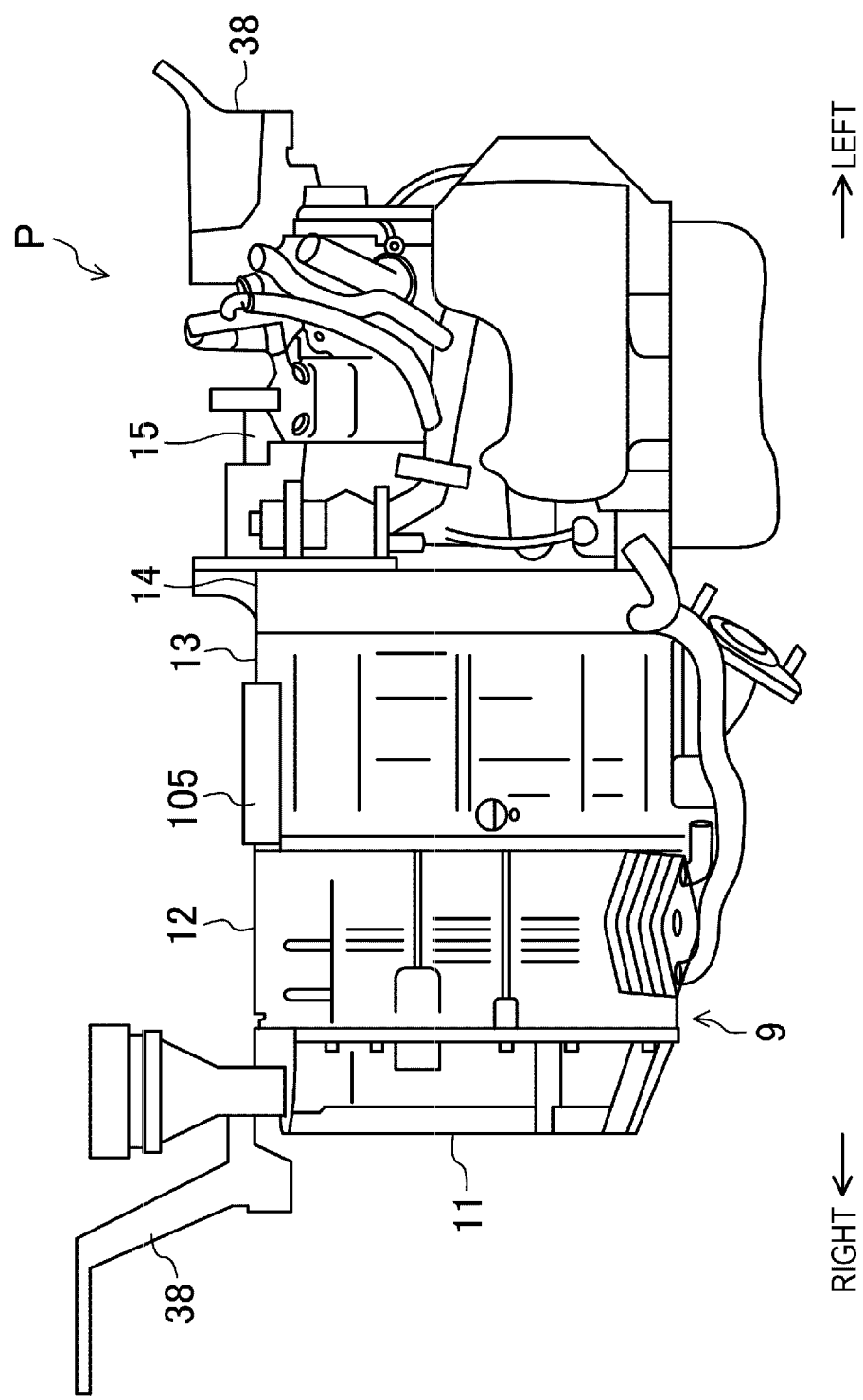
FIG. 4 is a front view of a power unit.

FIG. 4 is a front view of the power unit P. The drive motor 5, the reduction drive 6, and the generator 7 are accommodated in the drive unit housing 9. The drive unit housing 9 is integrally formed by coupling a first housing 11, a second housing 12, a third housing 13, and a fourth housing 14 in the vehicle width direction. In detail, the second housing 12 and the third housing 13 in substantially cylindrical shapes, each of which extends in the vehicle width direction, are coupled to each other, and openings on both of right and left sides thereof are closed by the first housing 11 and the fourth housing 14. In this way, the drive unit housing 9 is constructed. In an upper portion of the third housing 13, an actuator 105 is arranged near the front. In addition, an engine case 15 that accommodates the engine body 8 is integrated with the drive unit housing 9.

The first housing 11, the second housing 12, the third housing 13, the fourth housing 14, and the engine case 15 are integrated such that cylindrical circumferential wall portions with substantially the same diameter are coupled in a continuous manner. In particular, upper end portions of the first housing 11, the second housing 12, the third housing 13, the fourth housing 14, and the engine case 15 continue such that the circumferential wall portions are substantially flush. In this way, the drive motor 5, the reduction drive 6, the generator 7, and the engine body 8 are integrally arranged in this order in the vehicle width direction of the power unit compartment 2 such that heights thereof are substantially the same.

Figure 5:
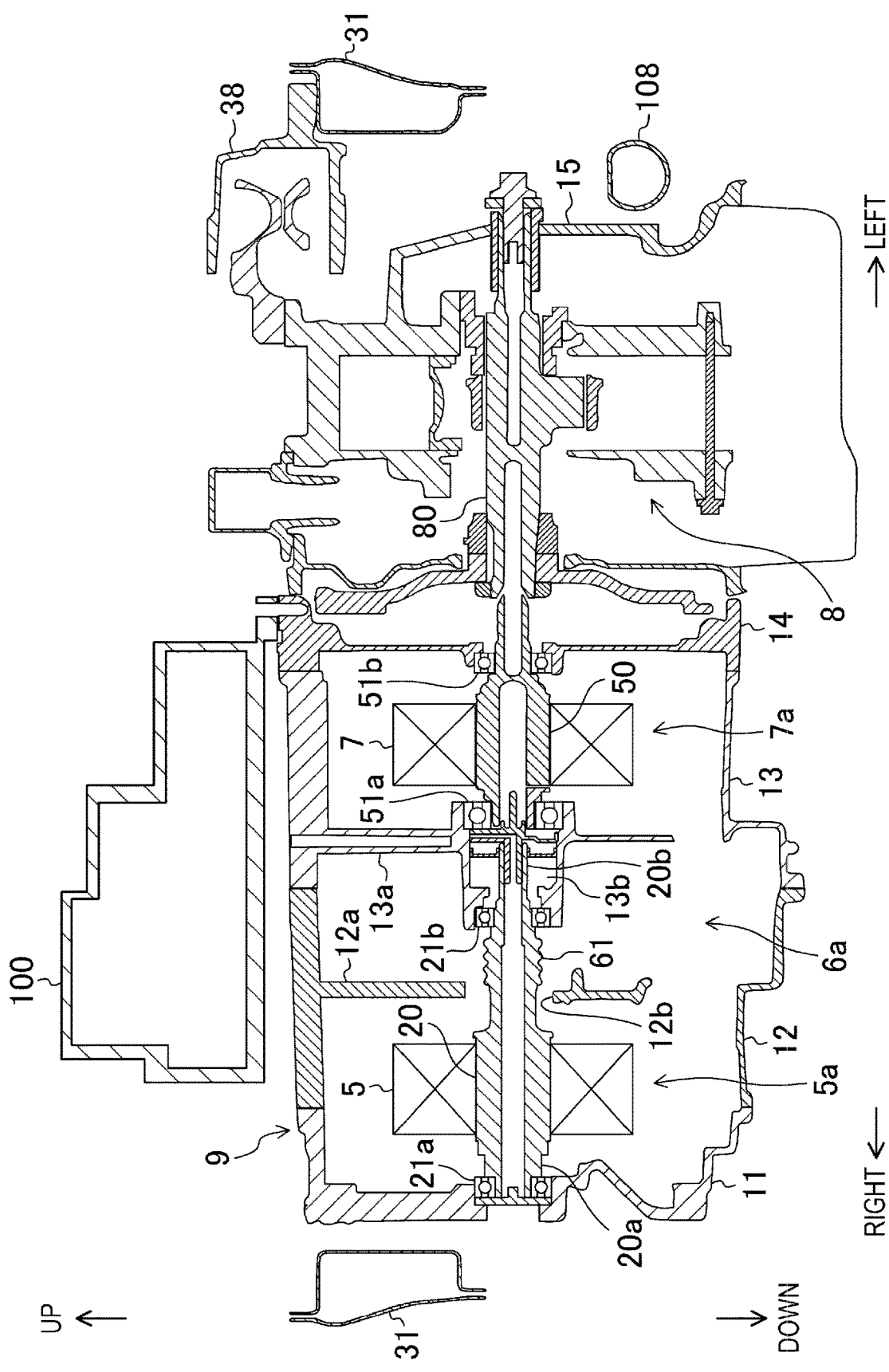
FIG. 5 is an end view that is taken along a plane corresponding to line V-V in FIG. 2.
Figure 6:
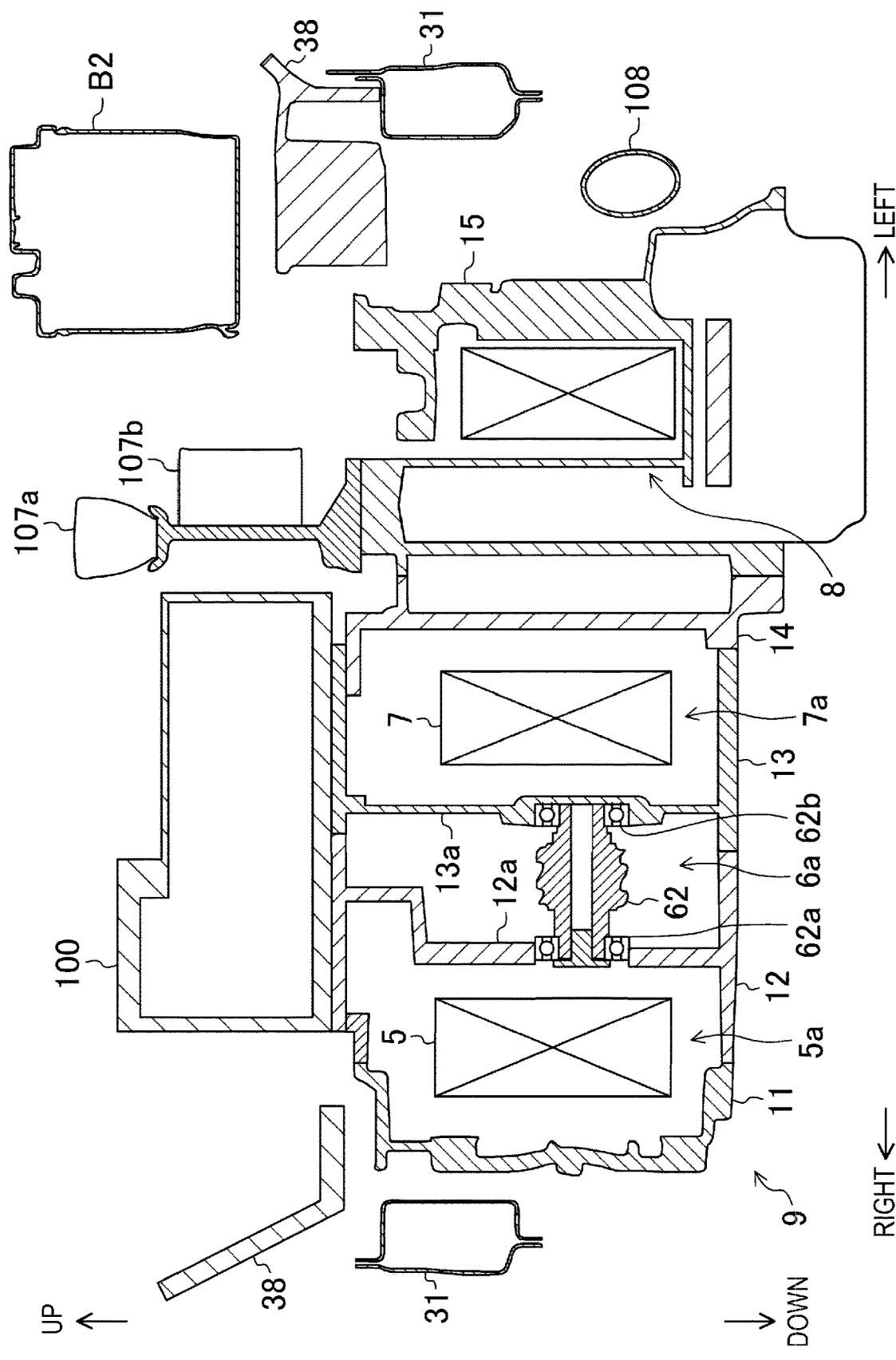
FIG. 6 is an end view that is taken along a plane corresponding to line VI-VI in FIG. 2.

FIG. 5 is a view schematically illustrating an end surface that is taken along a plane corresponding to line V-V in FIG. 2, and FIG. 6 is a view schematically illustrating an end surface that is taken along a plane corresponding to line VI-VI in FIG. 2. In FIG. 5 and FIG. 6, structures of the drive motor 5, the reduction drive 6, the generator 7, and the engine body 8 are omitted or simplified.

In the drive unit housing 9, the first housing 11 is located on the outermost side in the vehicle width direction and faces the body side frame 31 and the subframe 34. In an upper portion of the first housing 11, a right end portion of the power unit P is supported by the support member 38. The first housing 11 is provided with a first bearing section 21a. The first bearing section 21a rotatably supports a tip 20a on one side of a motor shaft 20.

The second housing 12 is coupled to a left side of the first housing 11. A cylindrical internal space of the second housing 12 is partitioned in the vehicle width direction by a partition wall 12a. In a substantially central portion of the partition wall 12a, a through hole 12b is provided to allow the motor shaft 20 to pass therethrough in the vehicle width direction. On the right side of the partition wall 12a, the drive motor 5 is arranged in a drive motor accommodating section 5a that is formed by the first housing 11 and the second housing 12. On the left side of the partition wall 12a, the reduction drive 6 is arranged in a reduction drive accommodating section 6a that is formed by the second housing 12 and the third housing 13. In addition, the partition wall 12a is provided with a fifth bearing section 62a at a position behind the motor shaft 20. The fifth bearing section 62a rotatably supports one end portion of an intermediate shaft 62 of the reduction drive 6.

The third housing 13 is coupled to the left side of the second housing 12. The third housing 13 has a partition wall 13a in a right end portion thereof, and the partition wall 13a partitions the third housing 13 in the vehicle width direction into the reduction drive accommodating section 6a and a generator accommodating section 7a. In a substantially central portion of the partition wall 13a, a through hole 13b is provided to allow the motor shaft 20 to pass therethrough in the vehicle width direction. A boss is formed in a circumferential edge portion of the through hole 13b, and the boss is projected to both of the right and left sides from the partition wall 13a. A second bearing section 21b is provided to an end portion on the reduction drive accommodating section 6a side of the through hole 13b. The second bearing section 21b rotatably supports the motor shaft 20. A third bearing section 51a is provided to an end portion on the generator accommodating section 7a side of the through hole 13b. The third bearing section 51a rotatably supports one end portion of a generator shaft 50. In addition, the partition wall 13a is provided with a sixth bearing section 62b at a position behind the motor shaft 20. The sixth bearing section 62b rotatably supports the other end portion of the intermediate shaft 62 of the reduction drive 6.

On the left side of the partition wall 13a, the fourth housing 14 is coupled to the third housing 13. On the left side of the partition wall 13a, the generator 7 is arranged in the generator accommodating section 7a that is formed by the third housing 13 and the fourth housing 14. The fourth housing 14 is provided with a fourth bearing section 51b. The fourth bearing section 51b rotatably supports the other end portion of the generator shaft 50. The fourth housing 14 is integrally constructed with the engine case 15 that is located adjacently and on the left side thereof.

The engine case 15 is coupled to the left side of the drive unit housing 9. A left end portion of the engine case 15 is separated from the body side frame 31 and the subframe 34. In an upper portion of the engine case 15, a left end portion of the power unit P is supported by the support member 38. The upper end portion of the engine case 15 is at substantially the same height as an upper end portion of the drive unit housing 9.

In the drive unit housing 9 and the engine case 15 described above, a rotary shaft 80 of the engine body 8, the generator shaft 50 of the generator 7, and the motor shaft 20 of the drive motor 5 extend in the vehicle width direction and are arranged on the same straight line.

The drive motor 5 includes a rotor and a stator (not illustrated) in addition to the motor shaft 20. A rotating magnetic field is generated when three-phase AC power is supplied to the stator, and the rotor and the motor shaft 20 are rotated by the rotating magnetic field.

The tip 20a on the one side of the motor shaft 20 is rotatably supported by the first bearing section 21a, and the motor shaft 20 runs across the drive motor accommodating section 5a from the first housing 11, passes through the partition wall 12a of the second housing 12, and enters the reduction drive accommodating section 6a.

A tip 20b on the other side of the motor shaft 20 runs through the through hole 13b from the reduction drive accommodating section 6a and passes through the partition wall 13a. The tip 20b on the other side of the motor shaft 20 is formed to reach the generator accommodating section 7a from the reduction drive accommodating section 6a.

In the reduction drive accommodating section 6a, the motor shaft 20 is integrally formed with an input shaft 61 of the reduction drive 6. The input shaft 61 receives a rotational force of the drive motor 5. At a position behind the motor shaft 20, the intermediate shaft 62 of the reduction drive 6 is arranged to be substantially parallel to the motor shaft 20. An unillustrated gear is disposed between the input shaft 61 and the intermediate shaft 62. The intermediate shaft 62 transmits the power, which is reduced by the gear, to an output shaft (not illustrated).

The generator 7 includes a rotor and a stator (not illustrated) in addition to the generator shaft 50. When the generator shaft 50 and the rotor are rotated by the power of the engine body 8, the stator generates the electric power due to electromagnetic induction.

The generator shaft 50 is arranged on the generator 7 side of the tip 20b on the other side of the motor shaft 20. The one end portion of the generator shaft 50 is supported by the third bearing section 51a, which is provided to the third housing 13, and the other end portion thereof is supported by the fourth bearing section 51b, which is provided to the fourth housing 14. The motor shaft 20 and the generator shaft 50 are spaced apart in the vehicle width direction and arranged on a straight line.

The rotary shaft 80 of the engine body 8 is arranged on the left side of the generator shaft 50. The generator shaft 50 and the rotary shaft 80 of the engine body 8 are spaced apart in the vehicle width direction and arranged on the straight line.

The engine body 8 is arranged adjacently on the left side of the generator 7. The engine body 8 is preferably a rotary engine. The rotary engine has a vertically compact structure when compared to a reciprocating engine, which makes it easy to substantially equalize the heights of the drive motor 5, the reduction drive 6, the generator 7, and the engine body 8. For this reason, these components can be arranged compactly.

The engine-related components are arranged above the engine body 8. The engine-related components include intake-related components that are arranged in front of the engine body 8, fuel and oil-related components that are arranged directly above the engine body 8, and the low-voltage battery B2 that is arranged behind the engine body 8. Examples of the intake-related components are the air cleaner 106 and an intake duct 106a. Examples of the fuel and oil-related components are the oil filter 107a and the oil cooler 107b.

The intake-related components and exhaust-related components are provided in front of the engine body 8. Examples of the intake-related components are the air cleaner 106 and the intake duct 106a. Examples of the exhaust-related components are an exhaust manifold (not illustrated) and an exhaust pipe 108 that continues from the exhaust manifold. That is, the engine body 8 is a forward-intake type and a forward-exhaust type.

As illustrated in FIG. 2 and FIG. 6, the low-voltage battery B2 and the air cleaner 106 as the engine-related components are arranged to be projected outward from the engine body 8 in the vehicle width direction. More specifically, the low-voltage battery B2 is arranged above the left support member 38 in an overlapping manner. The air cleaner 106 is arranged in front of the low-voltage battery B2 in a manner to be projected leftward from a position above the left body side frame 31. Thus, a space is provided on the lateral side of the engine body 8 and below the low-voltage battery B2 and the air cleaner 106. By using such a space, the exhaust-related components such as an exhaust pipe 108 extend from a position in front of the engine body 8, run through the lateral side of the engine body 8 and below the low-voltage battery B2 and the air cleaner 106, and are routed behind the engine body 8.

As it has been described so far, according to this embodiment, the drive motor 5, the reduction drive 6, the generator 7, and the engine body 8 are integrally arranged in this order in the vehicle width direction of the power unit compartment 2 such that the heights thereof are substantially the same. Then, the electric power conversion unit 100, in which the motor inverter 101, the electric power generation inverter 102, and the DC/DC converter 103 are integrated, is arranged above the drive unit housing 9, which accommodates the drive motor 5, the reduction drive 6, and the generator 7. The engine-related components such as the air cleaner 106, the intake duct 106a, the oil filter 107a, the oil cooler 107b, and the low-voltage battery B2 are arranged above the engine body 8. Since the electric power conversion unit 100 and the engine-related components can separately be arranged at the position above the drive unit housing 9 and the position above the engine body 8, respectively, it is possible to compactly arrange the power unit P, the electric power conversion unit 100, and the engine-related components.

In addition, the engine body 8 is the rotary engine, and the rotary shaft 80 thereof and the motor shaft 20 of the generator shaft 50 are arranged to extend in the vehicle width direction on the same straight line. Therefore, the further compact configuration can be obtained by setting the heights of the drive motor 5, the reduction drive 6, the generator 7, and the engine body 8 to be substantially the same.

Furthermore, the engine body 8 is the forward-intake type and the forward-exhaust type. The intake-related components, such as the air cleaner 106 and the intake duct 106a, are arranged in front of the engine body 8. The oil-related components, such as the oil filter 107a and the oil cooler 107b, are arranged directly above the engine body 8. The low-voltage battery B2 is arranged behind the engine body 8. In this way, it is possible to appropriately arrange the engine-related components in the front-rear direction at the position above the engine body 8.

Moreover, the low-voltage battery B2, the air cleaner 106, and the intake duct 106a are arranged to be projected outward from the engine body 8 in the vehicle width direction. Accordingly, the exhaust-related components such as the exhaust pipe 108 can run through the lateral side of the engine body 8 and below the low-voltage battery B2, the air cleaner 106, and the intake duct 106a, and be routed behind the engine body 8. Thus, the engine-related components including the exhaust-related components can be arranged compactly.

The above-described embodiment is merely illustrative, and thus the scope of the present disclosure should not be interpreted in a restrictive manner. The scope of the present disclosure is defined by the claims, and all modifications and changes falling within equivalents of the claims fall within the scope of the present disclosure.

INDUSTRIAL APPLICABILITY

The technique disclosed herein is useful as the electric vehicle in which the power unit, the electric power conversion unit, and the engine-related components are arranged compactly.

DESCRIPTION OF REFERENCE CHARACTERS

1 Vehicle
2 Power unit compartment
5 Drive motor
6 Reduction drive
7 Generator
8 Engine body
9 Drive unit housing
20 Motor shaft
50 Generator shaft
80 Rotary shaft
100 Electric power conversion unit
101 Motor inverter
102 Electric power generation inverter
103 DC/DC converter
106 Air cleaner
106a Intake duct
107a Oil filter
107b Oil cooler
108 Exhaust pipe
B1 High-voltage battery
B2 Low-voltage battery
P Power unit

The invention claimed is:

1. An electric vehicle including:
A drive motor that drives the vehicle by using electric power;
a reduction drive that reduces power from the drive motor and outputs the reduced power;
a generator that generates the electric power to be supplied to the drive motor; and
an engine body that drives the generator and is configured to transmit output of the reduction drive to a drive wheel, wherein
the drive motor, the reduction drive, the generator, and the engine body are integrally arranged in this order in a vehicle width direction of a power unit compartment such that respective heights thereof are substantially the same,
an electric power conversion unit, in which a motor inverter, an electric power generation inverter, and a DC/DC converter are integrated, is arranged above the drive motor, the reduction drive, and the generator, and
engine-related components are arranged above the engine body.

2. The electric vehicle according to claim 1, wherein the engine body is a rotary engine.

3. The electric vehicle according to claim 2, wherein a rotary shaft of the engine body, a generator shaft of the generator, and a motor shaft of the drive motor extend in the vehicle width direction and are arranged on the same straight line.

4. The electric vehicle according to claim 3, wherein the engine body is a forward-intake type and a forward-exhaust type, and
the engine-related components include:
intake-related components that are arranged in front of the engine body;
fuel and oil-related components that are arranged directly above the engine body; and
a battery that is arranged behind the engine body.

5. The electric vehicle according to claim 4, wherein the engine-related components are arranged to be projected outward from the engine body in the vehicle width direction, and
exhaust-related components run through a lateral side of the engine body and below the engine-related components, and are routed behind the engine body.

* * * * *